US00RE46656E

(19) United States
(12) Reissued Patent
Malatesta

(10) Patent Number: US RE46,656 E
(45) Date of Reissued Patent: Jan. 2, 2018

(54) DOCUMENT SEPARATOR

(71) Applicant: James Malatesta, Hockessin, DE (US)

(72) Inventor: James Malatesta, Hockessin, DE (US)

(21) Appl. No.: 15/189,723

(22) Filed: Jun. 22, 2016

Related U.S. Patent Documents

Reissue of:
(64) Patent No.: 7,303,188
Issued: Dec. 4, 2007
Appl. No.: 10/702,243
Filed: Nov. 6, 2003

(51) Int. Cl.
*B65H 3/04* (2006.01)
*B65H 5/00* (2006.01)

(52) U.S. Cl.
CPC ..... *B65H 5/00* (2013.01); *B65H 2301/44514* (2013.01)

(58) Field of Classification Search
CPC ..... B65H 5/00; B65H 2301/44514
USPC ..... 271/34, 104, 121, 137, 182, 122, 123, 271/124, 125, 229, 167, 900, 35, 138
See application file for complete search history.

(56) References Cited

U.S. PATENT DOCUMENTS 1,058,314 A * 4/1913 Lynch ..... B65H 3/047 271/34
3,976,291 A 8/1976 Bernardi et al. ..... B65H 3/10 271/104
4,114,870 A * 9/1978 Di Blasio ..... B65H 3/042 271/122
4,285,511 A * 8/1981 Abe ..... B65G 57/308 271/178
4,568,074 A * 2/1986 Murayoshi ..... B65H 3/063 271/119
4,575,068 A * 3/1986 Kato ..... B65H 3/5269 271/122
4,615,519 A * 10/1986 Holodnak et al. ... B65H 3/5246 271/122
4,718,809 A * 1/1988 Krasuski et al. ..... B65H 3/063 271/121
4,883,265 A * 11/1989 Iida et al. ..... B65H 29/38 271/201
4,909,499 A * 3/1990 O'Brien et al. ..... B65H 3/5269 271/10.06
4,973,039 A * 11/1990 Jeske et al. ..... B65H 33/12 271/151
5,005,821 A * 4/1991 Burger ..... B65H 31/08 271/198
5,062,600 A * 11/1991 Holbrook et al. ..... B65H 3/042 271/273
5,120,042 A * 6/1992 Goto et al. ..... B65H 3/0638 271/117
5,163,666 A * 11/1992 Kuo ..... B65H 3/042 271/10.03

(Continued)

FOREIGN PATENT DOCUMENTS

GB 2214495 A * 9/1989 ..... B65H 3/126
JP 60093049 A * 5/1985

(Continued)

*Primary Examiner* — William Doerrler
(74) *Attorney, Agent, or Firm* — James M. Lennon; Devlin Law Firm LLC

(57) ABSTRACT

A document separator for use in a document processing machine. The document separator has a flexible loop of material adjacent to a document transport mechanism so that it holds one or more documents back from being transported along a transport path while allowing a single document to be moved forward.

20 Claims, 6 Drawing Sheets

(56) References Cited

U.S. PATENT DOCUMENTS 5,181,706 A 1/1993 Yamamoto et al. ... B65H 3/126 271/104
5,201,508 A * 4/1993 Kuo ..... B65H 3/042 271/10.03
5,226,547 A 7/1993 Malatesta ..... B07C 3/06 209/584
5,249,793 A * 10/1993 Scheufler ..... B65H 29/14 271/188
5,295,675 A * 3/1994 Hain ..... B65H 3/063 271/104
5,398,922 A 3/1995 Malatesta ..... B07C 3/065 271/104
5,473,420 A * 12/1995 Rizzolo et al. .... B65H 31/3027 270/58.08
5,722,652 A 3/1998 Yoshida et al. ..... B65H 3/126 271/10.03
5,992,844 A * 11/1999 Dillinger et al. ..... B65H 29/68 271/182
6,003,857 A * 12/1999 Salomon et al. .... B65H 3/5246 271/122
6,135,441 A * 10/2000 Belec et al. ..... B65H 3/045 271/121
6,145,829 A 11/2000 Furmanski et al. ... B65H 3/122 271/100
6,276,679 B1 * 8/2001 Joyce et al. ..... B65H 3/042 271/122
6,302,606 B1 * 10/2001 Hayakawa et al. .... B41J 13/106 271/157
2003/0090050 A1 * 5/2003 Sueoka ..... B65H 7/08 271/10.01

FOREIGN PATENT DOCUMENTS

JP 61257838 A * 11/1986
JP 05024690 A * 2/1993
JP 08023420 A * 1/1996

* cited by examiner

DOCUMENT SEPARATOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The invention relates to document handling machinery.

BACKGROUND OF THE INVENTION

Various types of machinery are used to handle documents. For example, mail-sorting equipment feeds mail through a system that evaluates routing information on the mail and sorts the mail based on the routing information. Computer printers and facsimile machines are also examples of machines that handle documents. The common function of these machines is that they must separate documents from one another, i.e. there must be a singulating function. For example, a stack of paper is inserted into a printer, then each sheet must be separated from the stack to utilize it in the machine. Similarly, a mail-sorting machine may take a stack of mail and process each mail piece individually, requiring the individual mail items to be separated from one another.

It is noted that "documents" is used herein in the broadest sense possible, and includes for example, paper, mail, magazines, booklets, folders and the like. Documents need not consist of paper only but may also consist of other materials such as for example woven materials, plastics or metal, either alone or in combination.

Reliable document separating devices often are cumbersome, such as those that contain vacuum mechanisms to effectuate separation of documents that vary in thickness, dimensions or material. Less cumbersome devices typically rely primarily on friction between the document and the separator. These devices may employ, for example, grinding stones, stationary belts or rubber wheels. Generally, the device is set for a particular document thickness. The setting is adjusted when documents of a different thickness are to be processed. Such devices, are not self-adjusting, so they cannot process a stack of varying thickness documents. Because they do not automatically adjust satisfactorily for varying document thickness, the coefficient of friction between the document and separator changes, thereby causing documents to be transported or fed through the system two or more at a time.

Accordingly, there is a need for a practical, reliable document separator to singulate documents, such as stacks of sheets of paper or mail of varying thickness.

SUMMARY OF THE INVENTION

The present invention provides a document separator for use in a document processing machine. The document separator has a flexible loop of material adjacent to a document transport mechanism so that it holds one or more documents back from being transported along a transport path while allowing a single document to be moved forward.

DESCRIPTION OF THE DRAWINGS

The invention is best understood from the following detailed description when read with the accompanying drawings.

DETAILED DESCRIPTION OF THE INVENTION

Figure 1:
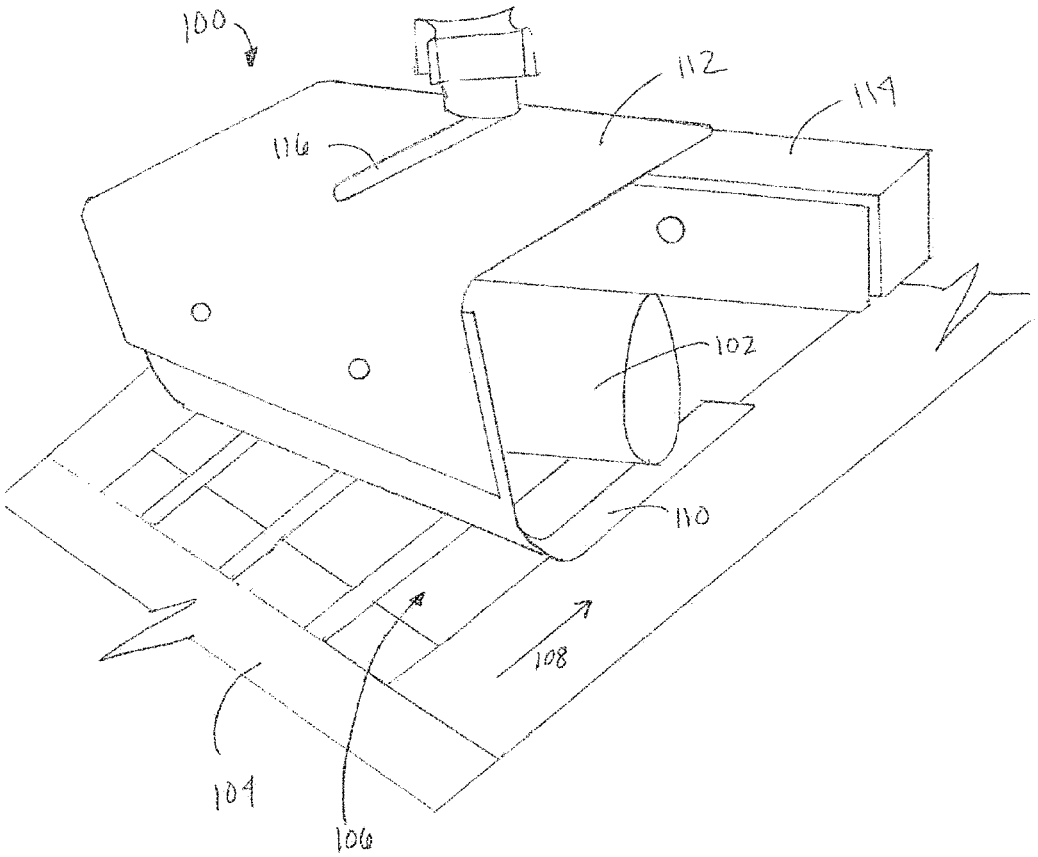
FIG. 1 depicts a first view of a document separator according to an illustrative embodiment of the invention.

FIG. 1 depicts a first view of a document processing machine 100 having a document separator according to an illustrative embodiment of the invention. A flexible loop of material 102 facilitates singulation of documents as they are transported through the document processing machine. A plurality of documents is placed in holding area 104. A transport mechanism 106 feeds the documents from holding area 104 along a path in a direction depicted by arrow 108. Flexible loop 102 inhibits the transport of documents other than the document for which transport through the machine is desired. For the machine depicted in FIG. 1, the document in contact with transport mechanism 106 will be moved forward, with any other documents in the initial group being held back by flexible loop 102. Flexible loop 102 inhibits transport of documents by creating sufficient friction between the loop and the document nearest the loop and/or between adjacent documents. Friction between the transport mechanism and the individual document to be transported is greater than friction between the remaining documents and each other or flexible loop 102. Thus, the transport mechanism moves only the document directly adjacent to it through the machine.

Advantageously, flexible loop 102 creates a spring-like effect to maintain adequate pressure against the documents and between the documents while still allowing a single document to be separated from the group. Flexible loop 102 also allows documents of different thickness to be singulated. Flexible loop 102 will "spring" back after documents pass through. In an exemplary embodiment, document processing machine 100 singulates documents varying in thickness from about 0.002 inches to 0.25 inches. Embodiments of the inventive document separator can be used, for example, to singulate a stack of paper differing in bond from 16 bond to 72 bond, or approximately 0.003 inches to 0.011 inches, respectively. A further illustrative document thickness range is about 0.01 inches to about 0.25 inches, which may be desirable for mail items. For a document processing machined used only for thick items, an illustrative range is 0.10 inches to about 0.25 inches. Depending on the material used for flexible loop 102 and/or its positioning, different thickness ranges may be processed.

Flexible loop 102 may be comprised of numerous different materials. It may be a single material such as rubber or polyamide, or a composite such as Habasit™ F-1. Habasit™ F-1 is suitable because it has the desired stiffness. It is also durable for lasting use. Habasit™ F-1 is formed from a polyamide layer disposed between acrylonitrile-butadiene-rubber layers. It has a tensile force of 4.5 N and a mass of 1.25 kg/m$^2$. It is commonly used for machine tapes, and has a rough conveying side. For many applications, loop materials with properties the same as Habasit™ F-1 or within a 15% range in either direction would be suitable. More preferably properties are within a 10% range and most preferably within a 5% range. Stiffness is one of the most significant loop material properties, as it has a bearing on the pressure exerted on the documents and its spring-like action. Memory materials would be particularly well suited for this application. Loop material thickness is preferably in the range of 1.0 mm to 1.5 mm, however, the optimum thickness may depend on such things as the application and size of loop.

FIG. 1 further depicts an optional flap 110. Flap 110 may further enhance the separating function of flexible loop 102. In the illustrative embodiment of FIG. 1, flap 110 is upstream from flexible loop 102 and adjacent document transport mechanism 106 to adjust the pressure between flexible loop 102 and the documents. This may be necessary for certain applications, such as a particular thickness of documents. Flap 110 preferably curves toward loop 102 and preferably extends under loop 102. Flap 110 may not need to be flexible in its entirety, but will need some flexibility for applications such as transport of documents of varying sizes. Flexibility can be in any portion for flap 110. For example, flexibility can be achieved by a hinge-like mechanism on a rigid flap with a spring-like mechanism, wherein the rigid portion of the flap is adjacent to the documents.

Figure 4:
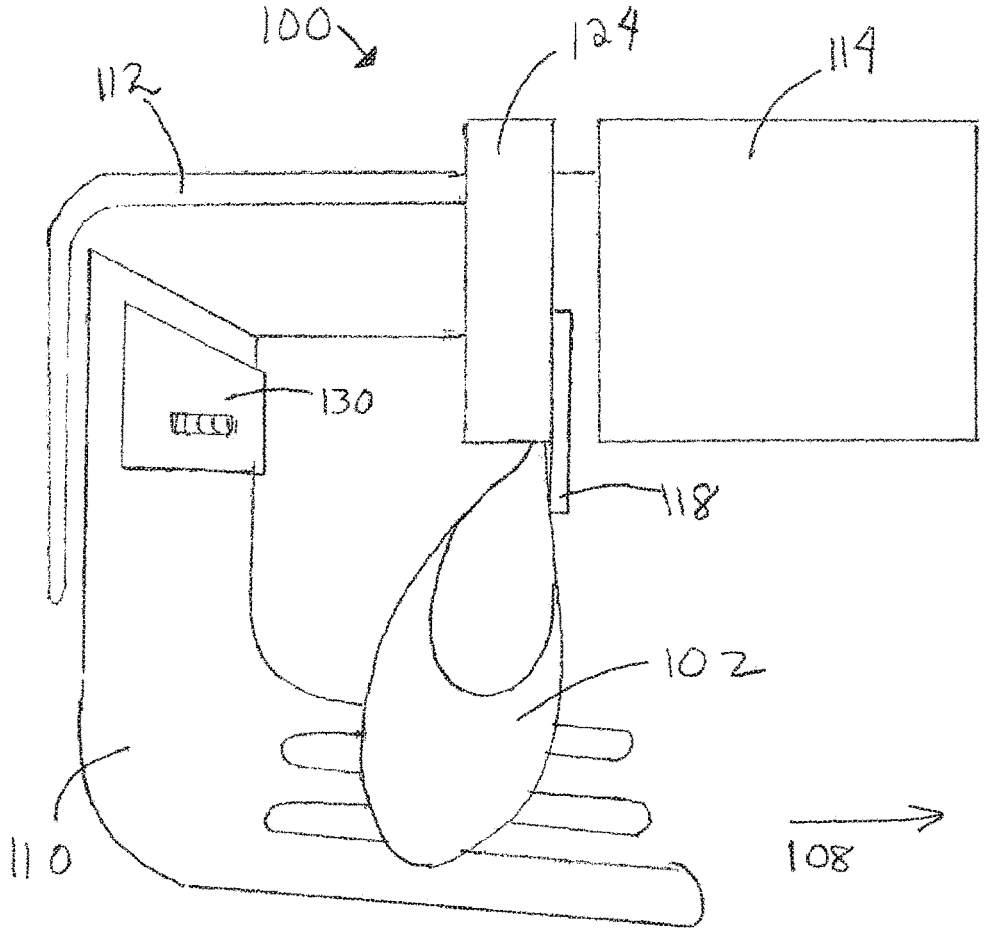
FIG. 4 depicts a fourth view of a document separator according to an illustrative embodiment of the invention.

The closer flexible flap 110 is to flexible loop 102 in the direction of document transport, the greater the pressure between documents, and thus the greater the coefficient of friction. Preferably, document processing machine 100 includes a mechanism to vary the distance between flexible loop 102 and flexible flap 110. An illustrative embodiment of an adjustment mechanism is shown in FIG. 1. The mechanism may comprise flap support component 112 to which flexible flap 110 is attached. FIG. 4 depicts another view of the illustrative device for attaching flexible flap 110 to document processing machine 100. In this case flexible flap 110 is fastened to flap support component 112 by a flap holding component 130 screwed into flap support component 112. Flap support component 112 is slidably attached to a stationary component 114. Stationary component 114 has a peg projecting up through a slot 116 in flap support component 112, allowing support component 112 to slide toward or away from flexible loop 102. The projecting peg is preferably threaded so that a knob 116 may be used to tighten flap support component 112 to stationary component 114 at a desired position.

Figure 2:
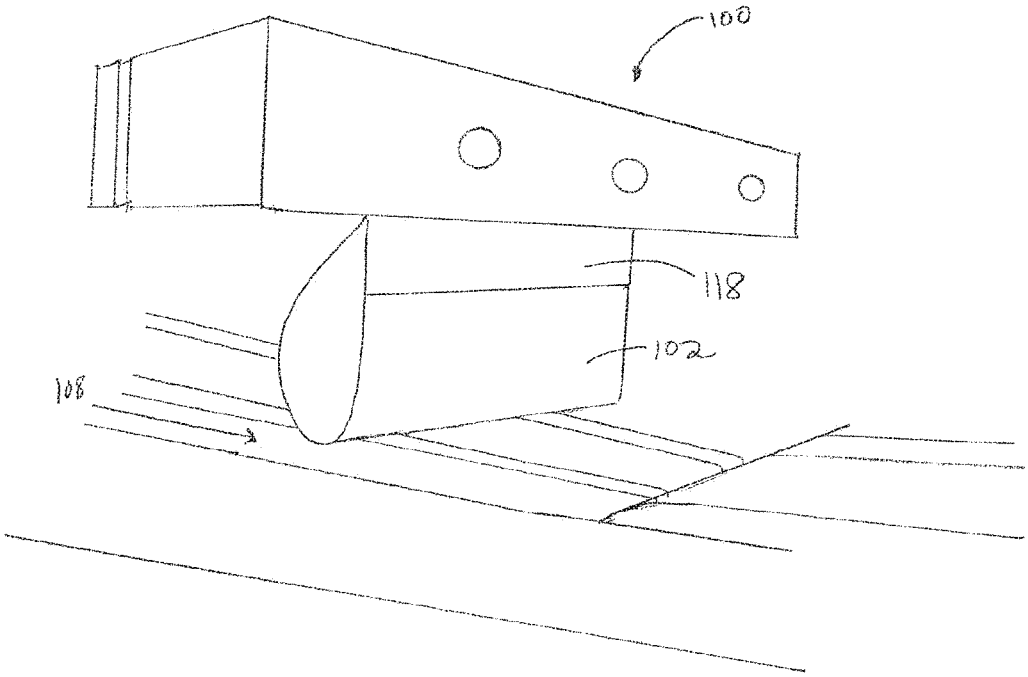
FIG. 2 depicts a second view of a document separator according to an illustrative embodiment of the invention.

FIG. 2 depicts a second view of document processing machine 100 having a document separator according to an illustrative embodiment of the invention. A stiffener component 118 is included adjacent to a flexible loop 102 to reduce the flexibility of loop 102. Stiffener component 118 is made of a material that reduces the flexibility of loop 102. Preferably it comprises a material less flexible than that of flexible loop 102, however, even using the same material as that of the loop will reduce loop 102's flexibility. Pressure on documents is changed by addition of the stiffener component, and thus the ability to singulate particular documents is affected.

The distance between the loop and the transport mechanism affects the pressure on the documents, and therefore must be adapted for a particular document type or thickness. Preferably the distance is in the range of about 0 to 5 mm from the document transport mechanism. In an exemplary embodiment a mechanism to adjust the distance between the flexible loop and the document transport mechanism is included. An illustrative loop adjustment mechanism includes a loop support to which the loop is attached wherein the support is slidably attached to a stationary component so that the flexible loop can be moved toward or away from the document transport mechanism.

In general, by varying parameters such as loop material and distance between the loop and the transport mechanism, and adding components to affect flexibility of the loop or pressure on documents such as a stiffening component or flexible flap, the invention can be adapted to a variety of document processing machines and document types.

Figure 3:
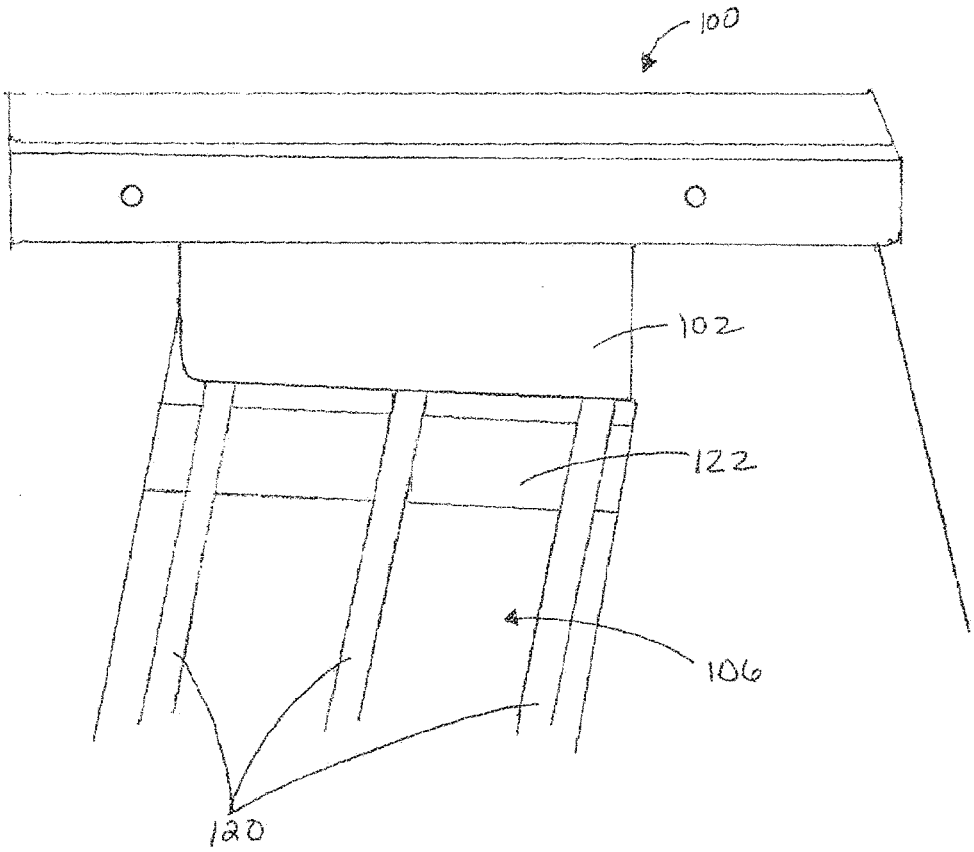
FIG. 3 depicts a third view of a document separator according to an illustrative embodiment of the invention.

FIG. 3 depicts a third view of document processing machine 100 having a document separator according to an illustrative embodiment of the invention. Document processing machine 100 has a transport mechanism 106, which includes transport belts 120. Transport belts are flexible, and therefore, can deflect away from flexible loop 102. A document transport mechanism support, such as roller 122, positioned adjacent to flexible loop 102 can inhibit such deflection. The document transport mechanism support component may span the entire flexible loop or a portion thereof. In a belted transport mechanism, the belts may also be supported along their length. In general the document transport mechanism support inhibits deflection or bending of any document transport parts that would affect the pressure between the loop and the transport mechanism. The document transport mechanism support can comprise one or more parts, wherein the parts need not be attached to one another.

FIG. 4 depicts a fourth view of document processing machine 100 having a document separator according to an illustrative embodiment of the invention. This view shows an exemplary attachment configuration of a flexible loop 102 to a loop support component 114. A portion of flexible loop 102 is sandwiched between loop support component 114 and loop holder 124. Such a configuration may also provide another mechanism for adjusting the distance between flexible loop 102 and transport mechanism 106. In this exemplary embodiment, stiffener component 118 is also held between loop support component 114 and loop holder 124.

Figure 5:
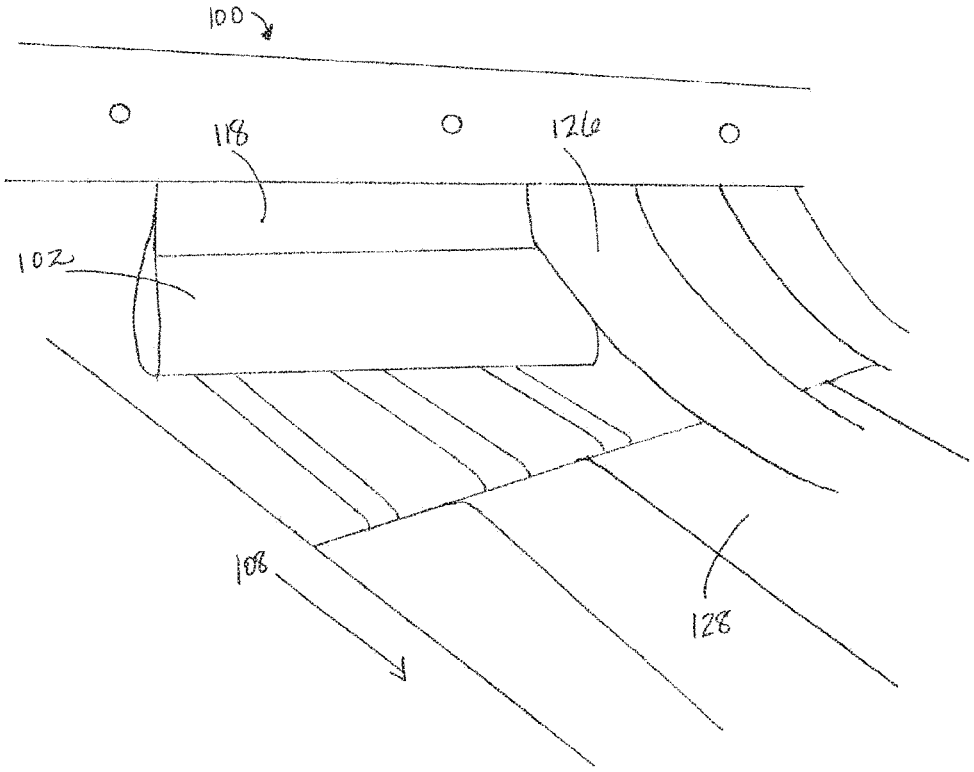
FIG. 5 depicts a fifth view of a document separator according to an illustrative embodiment of the invention.

FIG. 5 depicts a fifth view of document processing machine 100 having a document separator according to an illustrative embodiment of the invention. This view shows an optional, exemplary pressure component 126. Pressure component 126 exerts pressure on documents to facilitate transport of documents through the machine. Exemplary pressure component 126 includes one or more strips fashioned from a single piece of material or one or more separate sheets of material, preferably made of metal, that exert pressure toward belt(s) 128 to reduce document slippage. Use of metal or other smooth materials allows documents to be slid beneath it to align documents as needed. Pressure component 126 may be attached to stationary component 114, although other attachment configurations are within the scope of the invention. Pressure component 126 can also be in the form of a roller adjacent to the transport mechanism. The roller is preferably a foam idler roller, but may be a drive roller or stationary roller, or made of other suitable materials. Preferably pressure component 126 allows for different thickness documents to pass by it. In general, pressure component 126 may be in any form that would force documents toward any belt or other transport device to assist movement of the documents in the desired direction.

Flexible loop 102 may be used alone, or in conjunction with one or more flaps or other flexible loops, and in any sequence of loops and flaps. Flaps may comprise, for example, material such as that used for flexible loop 102.

Pressure components, such as part 126, can also serve as flaps. The loops and/or flaps may be in contact or spaced apart from a transport belt moving documents along a desired path.

Figure 6:
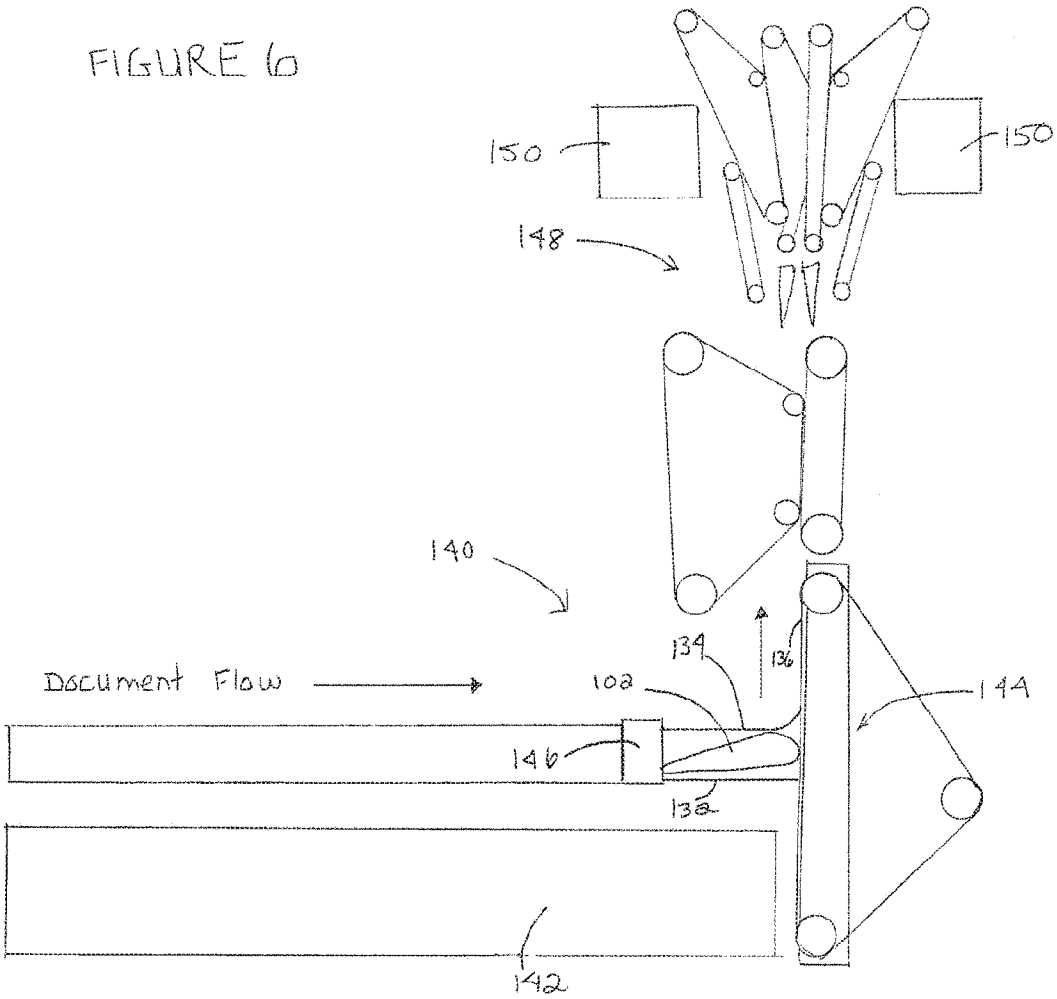
FIG. 6 depicts a loop-type document separator used in conjunction with flaps according to an illustrative embodiment of the invention.

FIG. 6 depicts flexible loop 102 used in conjunction with an inner flap 132 and outer flap 134 in an illustrative embodiment of the invention. Inner flap 132 is mounted generally perpendicular to a transport belt 136 and is disposed for making edge contact or may be spaced very slightly from belt 136 so that a document may readily be conveyed between flap 132 and belt 136. Flexible loop 102, however, is disposed for making some surface contact with belt 136 so as to apply a greater contact area against a document thus holding back any upstream documents not in contact with belt 136 while belt 136 continues to transport a document. Outer flap 134 is disposed for making greater surface contact than inner flap 132. Thus in this embodiment, the document is gradually subjected to increasing surface contact on its side opposite belt 136 to assure maintaining the document in contact with belt 136 as the document is being transported through the system, while holding back the next document. Flaps should provide flexibility to allow documents of differing thickness to pass through, however, such flexibility need not necessarily be provided by the flap material itself. A hinged flap in conjunction with a spring-like mechanism may also be used.

In the preferred practice of this invention the flaps and/or loop(s) are adjustably mounted in any suitable manner so that their distance toward and away from belt 136 can be varied in accordance with the thickness of documents or with wear characteristics of the flap(s) and loop(s). Preferably flap(s) and loop(s) are jointly mounted, such as by mounting block 146. If desired, however, the flaps may be individually mounted. This may aid adjustability or manufacturing, for example. The scope of the invention includes any number of flaps or loops used in conjunction with one another to improve reliable document separation. The loop(s) and flap(s) can be in any order. Preferably they are arranged so that there is increasing contact between the flap/loop and the transport belt. It should be noted that the system depicted in FIG. 6 feeds documents on edge, however, the invention is not limited to such embodiments. Documents may be fed in a flat manner or on edge within the scope of the invention for any loop and flap combination, or for use of a loop without one or more flaps.

The invention further includes a document processing system that incorporates the inventive document separator. FIG. 6 depicts an illustrative embodiment of a document processing system 140. Document processing system 140 has a document transport mechanism 142 by which documents are transported along a path. A feeder assembly 144, such as depicted in FIG. 6, receives a plurality of documents. Feeder assembly 144 has a flexible loop of material wherein the flexible loop is adjacent to the document transport mechanism so that it holds one or more documents back from being transported along the path by the document transport mechanism. A sorter assembly 148 may also be included in functional cooperation with and proximate to the feeder assembly to receive documents from the feeder and sort documents into categories. Receptacles 150 can be included into which sorted documents are delivered. Various configurations of sorting assemblies, transport mechanisms and feeder assemblies known in the art can be used in the document processing system. In an exemplary embodiment, the document processing system processes mail items. In a preferred embodiment, components in addition to the flexible loop, are chosen so that documents of varying thickness can be processed. While the invention has been described by illustrative embodiments, additional advantages and modifications will occur to those skilled in the art. Therefore, the invention in its broader aspects is not limited to specific details shown and described herein. Modifications, for example, to the materials, sizes, and attachment and transport mechanisms may be made without departing from the spirit and scope of the invention. Accordingly, it is intended that the invention not be limited to the specific illustrative embodiments, but be interpreted within the full spirit and scope of the appended claims and their equivalents.

The invention claimed is:

1. A document separator comprising:

a flexible loop of material;

a document transport mechanism by which documents are transported along a path; and one or more flaps adjacent to which faces of the documents pass before, after, or both before and after passing adjacent to the flexible loop;

wherein the flexible loop is adjacent to the document transport mechanism so that it holds one or more documents back from being transported along the path by the document transport mechanism;

wherein the flexible loop is not disposed around a pulley assembly capable of imparting motion to the flexible loop; and wherein at least one flap contacts the document faces as they pass adjacent to it.

2. A document separator comprising:

a flexible loop of material; and a document transport mechanism by which documents are transported along a path;

wherein the flexible loop is adjacent to the document transport mechanism so that it holds one or more documents back from being transported along the path by the document transport mechanism;

a pressure adjusting component, wherein the pressure adjusting component comprises:

a flexible flap; and an adjustment mechanism;

wherein the adjustment mechanism allows the flap to be positioned at varying distances from the flexible loop along a path of the documents.

3. The document separator of claim 2 further comprising:

a stiffener component comprising one or more materials less flexible than the flexible loop material;

wherein the stiffener spans at least a portion of the loop to reduce the flexibility of the loop.

4. The document separator of claim 2 wherein the adjustment mechanism comprises:

a support to which the flexible flap is attached;

wherein the support is slidably attached to a stationary component to move the flexible flap substantially along the path of the documents.

5. The document separator of claim 2 wherein the flexible loop is made of a material comprising polyamide, rubber or a combination thereof.

6. The document separator of claim 2 wherein the loop is a distance in the range of about 0 to 5 mm from the document transport mechanism.

7. The document separator of claim 2 further comprising:

a mechanism to adjust the distance between the flexible loop and the document transport mechanism.

8. The document separator of claim 7 wherein the loop adjustment mechanism comprises:

a support to which the loop is attached;

wherein the support is slidably attached to a stationary component [to] so that the flexible loop can be moved toward or away from the document transport mechanism.

9. The document separator of claim 2 further comprising:

a document transport mechanism support component to reduce deflection of one or more document transport mechanism belts.

10. The document separator of claim 9 wherein the flexible loop is positioned proximate to at least a portion of the document transport mechanism support component.

11. The document separator of claim 2 wherein the flexible loop comprises a material having a thickness in the range of about 1.0 mm to 1.5 mm.

12. The document separator of claim 2 further comprising:

one or more additional flexible loops.

13. The document separator of claim 2 capable of separating documents varying in thickness from about 0.002 inches to about 0.25 inches.

14. The document separator of claim 2 capable of separating documents varying in thickness from about 0.003 inches to 0.011 inches.

15. A document processing machine comprising a document separator according to claim 2.

16. A document processing system comprising a document separator according to claim 1; and a sorter assembly in functional cooperation with and proximate to the feeder assembly to receive documents therefrom and sort documents into categories.

17. A document processing system comprising a document separator according to claim 2;

a feeder assembly for receiving a plurality of documents, the feeder assembly having a flexible loop of material wherein the flexible loop is adjacent to the document transport mechanism so that it holds one or more documents back from being transported along the path by the document transport mechanism; and a sorter assembly in functional cooperation with and proximate to the feeder assembly to receive documents therefrom and sort documents into categories.

*18. The document separator of claim 1, wherein at least one flap curves toward and extends under the flexible loop.*

*19. The document separator of claim 1, wherein at least one flap adjusts to documents of varying sizes by a spring-like mechanism connected to a hinge attached to the flap.*

*20. The document separator of claim 1, wherein at least one flap curves toward and extends under the flexible loop and wherein the curved flap adjusts to documents of varying sizes by a spring-like mechanism connected to a hinge attached to the flap.*

* * * * *